United States Patent [19]

Reilly et al.

[11] Patent Number: 4,648,832

[45] Date of Patent: Mar. 10, 1987

[54] MOLDED WINDOW GASKET ASSEMBLY AND APPARATUS AND METHOD FOR MAKING SAME

[75] Inventors: Albert F. Reilly, Howell; John L. Sanok, Grosse Isle, both of Mich.

[73] Assignee: Sheller Globe Corporation, Toledo, Ohio

[21] Appl. No.: 505,196

[22] Filed: Jun. 17, 1983

[51] Int. Cl.⁴ .................... B29C 45/03; B01F 13/00
[52] U.S. Cl. .................... 425/543; 366/338; 425/116; 425/129 R; 425/200
[58] Field of Search ............. 425/543, 817 R, 110, 425/116, 127, 129 R, 121, 200; 422/131–133; 366/336–341

[56] References Cited

U.S. PATENT DOCUMENTS

| | | |
|---|---|---|
| 1,637,697 | 8/1927 | Jacobsen .................... 366/336 |
| 2,025,198 | 12/1935 | Conrow . |
| 2,258,724 | 10/1941 | Wagner et al. . |
| 2,266,235 | 12/1941 | Mollare . |
| 2,342,758 | 2/1944 | Saunders et al. . |
| 2,576,392 | 11/1951 | Downes . |
| 2,645,827 | 7/1953 | Koll . |
| 2,701,041 | 2/1955 | Toth . |
| 2,718,664 | 9/1955 | Schweitzer .................... 425/110 |
| 2,966,435 | 12/1960 | Kassinger . |
| 2,974,407 | 3/1961 | Barr . |
| 3,119,704 | 1/1964 | Harrell et al. .................... 366/337 |
| 3,166,795 | 1/1965 | Joffe .................... 249/142 |
| 3,263,014 | 7/1966 | Deisenroth .................... 425/129 R |
| 3,381,340 | 5/1968 | Chapin, Jr. .................... 156/578 |
| 3,387,075 | 6/1968 | Wilcox .................... 264/263 |
| 3,450,022 | 6/1969 | Engel .................... 366/337 |

(List continued on next page.)

FOREIGN PATENT DOCUMENTS

| | | |
|---|---|---|
| 1123201 | 5/1982 | Canada . |
| 1141130 | 2/1983 | Canada . |
| 56-154025 | 11/1981 | Japan . |
| 57-158481 | 9/1982 | Japan . |
| 1327390 | 8/1973 | United Kingdom . |
| 1478714 | 7/1977 | United Kingdom . |
| 1523547 | 9/1978 | United Kingdom . |
| 2049542 | 12/1980 | United Kingdom . |
| 2057338 | 4/1981 | United Kingdom . |
| 2079667 | 1/1982 | United Kingdom . |
| 2115739 | 9/1983 | United Kingdom . |

OTHER PUBLICATIONS

Mondur PF—Modified Polyisocyanate Product Code: C-261—Mobay Chemical Corporation.
Mondur CD—Polyisocyanate Product Code: C-90-5—Mobay Chemical Corporation.

(List continued on next page.)

*Primary Examiner*—Willard E. Hoag
*Attorney, Agent, or Firm*—Harness, Dickey & Pierce

[57] ABSTRACT

An improved window gasket assembly and the apparatus and associated method for reaction injection molding such assemblies, as well as other molded articles, are disclosed. The gasket is preferably integrally molded from an elastomeric material such as urethane onto a substantially transparent window panel. The gasket and window assembly can then be mounted and secured directly to a vehicle body panel opening, for example, with adhesives, thereby eliminating the need for discrete mechanical fasteners. In a preferred embodiment of the invention, an improved aftermixer and gating apparatus includes a mixing body in which a flowable multi-constituent molding material is separated into a number of generally serpentine mixing passageways and reunited in a common mixing cavity before being conveyed through a fan-gate passageway to the mold cavity. Adjustment means is provided for selectively altering the size of the mixing cavity and its inlet openings in order to selectively alter the back-pressure exerted on the material flowing therethrough, thereby enhancing the mixing of the molding material constituents. An improved mold apparatus is also preferably employed and includes elongated elastomeric members along the preferable edge of the mold cavity for supportingly engaging the mold members and substantially minimizing or preventing flashing of the molding material therefrom.

10 Claims, 5 Drawing Figures

U.S. PATENT DOCUMENTS

| | | | |
|---|---|---|---|
| 3,470,912 | 10/1961 | Bydal | 366/338 |
| 3,523,994 | 8/1970 | Shockey | 264/252 |
| 3,719,222 | 3/1973 | Harding et al. | |
| 3,744,201 | 7/1973 | Dohnahl | 52/397 |
| 3,776,591 | 12/1973 | Krueger | 296/146 |
| 3,851,432 | 12/1974 | Griffin | 52/400 |
| 3,884,007 | 5/1975 | Thoman | 52/624 |
| 3,924,989 | 12/1975 | Althausen et al. | 366/336 |
| 3,941,355 | 3/1976 | Simpson | 366/341 |
| 4,007,536 | 2/1977 | Soderberg et al. | 29/421 R |
| 4,072,340 | 2/1978 | Morgan | 296/84 B |
| 4,097,928 | 6/1978 | Fries | 366/336 |
| 4,139,234 | 2/1979 | Morgan | 296/84 R |
| 4,155,969 | 5/1979 | Hendry | 264/45.1 |
| 4,255,367 | 3/1981 | Wallace et al. | 264/45.1 |
| 4,265,965 | 5/1981 | Chancler | 264/45.1 |
| 4,303,728 | 12/1981 | Houdek et al. | 428/319.7 |
| 4,336,009 | 6/1982 | Wolf | 425/116 |
| 4,340,311 | 7/1982 | Crandal | 366/336 |
| 4,361,407 | 11/1982 | Pellegrini | 422/133 |
| 4,363,191 | 12/1982 | Morgan | 49/381 |
| 4,364,595 | 12/1982 | Morgan et al. | 296/84 R |
| 4,409,758 | 10/1983 | Dickerson et al. | 49/463 |
| 4,561,625 | 12/1985 | Weaver | 425/127 |

OTHER PUBLICATIONS

Technical Information—Isonate 143L—The Upjohn Company.
Technical Information—Isonate 181—The Upjohn Company.
Technical Information—Isonate 191—The Upjohn Company.
Technical Information—Isonate 240—The Upjohn Company.
3,759,004 09001973 Kent 52 400
Bayer Polyurethanes, Bayer Chemical Co., W. Germany, circa 1979 (Ed. #1.79E35-7109/847991), pp. 130-139.
"RIM Emerges as a Major Process"—Modern Plastics, Aug. 1979.
Urethane Chemicals Bulletin—Thanol SF—6503 POLYOL—Texaco Chemical Company.
Money Making Ideas—Module Slashes Cost, Weight of Automobile Quarter Window 72/Design News/-11—3—80 (2 sheets).
Bulletin 395—WITCO FOMREZ UL-28 "High Performance Organotin Catalyst", Witco Chemical Organics Division—Jan. 1980.
Material Safety Data Sheet—DABCO 33-LV—Air Products & Chemicals, Inc., 1980.
Technical Bulletin—PRC 789 "Mold Release Agent for Rim/Microcellular Urethanes—Low Mold Temperatures" Park Chemical Company.
Formula Selection—"FREKOTE: The Unconditional Release"—Frekote, Inc.
Chemical Coatings—Polane T. Green (Modified) SA8060-G64—Sherwin Williams Company—May 1981.
Release Agents from CONTOUR.

MOLDED WINDOW GASKET ASSEMBLY AND APPARATUS AND METHOD FOR MAKING SAME

BACKGROUND AND SUMMARY OF THE INVENTION

The invention relates generally to molded window gaskets and to the reaction injection molding of such articles from a multi-constituent material in a mold cavity. More particularly, the invention relates to such gaskets for automotive applications and to equipment and methods of reaction injection molding of such articles, wherein the elastomeric window gaskets are integrally molded onto a window panel of glass or other transparent material.

It has been known in the past to fabricate articles such as modular window gaskets for vehicular installations from materials such as polyvinylchloride (PVC) using conventional compression or injection molding techniques. Some of such window gaskets have been injection molded directly onto the window panel, which is made of glass or other substantially transparent material. The window and gasket assemblies have then been installed in a vehicle or other window frame with adhesives and/or with integrally molded fastener protrusions, as disclosed, for example, in U.S. Pat. Nos. 4,072,340 and 4,139,234. It has been found, however, that window panel breakage has been unacceptably high in such prior processes because of the high pressures required in the injection molding processes and because of the hardness and rigidity of the mold structures involved. Additionally, because of the types of materials previously used in molding the gaskets, such as rubber or polyvinylchloride (PVC), it has been found that proper adhesion of such gaskets to metal body panels and to glass window panels has been difficult to attain, thereby resulting in water leaks, wind noise, and other related problems, as well as requiring the use of mechanical fasteners to secure the assemblies to the body panels.

In accordance with the present invention, improved apparatuses and methods of reaction injection molding articles such as vehicular window gaskets are provided in order to overcome the above-discussed disadvantages. Such methods and apparatus allow window gaskets to be reaction injection molded from multi-constituent liquid materials, such as urethane, for example, and to be molded at relatively low pressures directly onto the glass or other transparent window panels. The gasket and window panel assemblies can then be mounted directly into a window opening in a body panel and secured thereto with adhesives without the need for mechanical fastener devices, thereby simplifying the installation process and making it better suited for robotic or other automated equipment. All or a portion of the gasket can also be coated with a pigment decorative material in the mold cavity if desired.

The gaskets according to the present invention may also be fabricated with a lower cross-sectional profile, thereby providing for a smooth aerodynamically advantageous fit between the window assembly and the body panel. Such lower profile also requires less offset or other forming of the body panel area surrounding the window opening, thus simplifying the body panel fabrication and increasing the design flexibility for such body panels. Also, because the gasket and window assembly is preferably bonded and secured to the body panel substantially continuously around the window opening periphery, the localized stress concentrations caused by spaced, discrete mechanical fasteners are substantially avoided and the bonding and securing forces are more evenly distributed. This allows the window panel to effectively contribute to the structural integrity of the installation, and also to allow for a reduction in window panel thickness and weight.

In a preferred embodiment of the present invention, an aftermixer apparatus for use in a reaction injection molding system includes a mixing body having at least one common inlet passageway for receiving a multi-constituent material in a pressurized flowable state. The apparatus includes a number of mixing passageways adapted to receive the material from the common inlet passageway and separate it into a corresponding number of material flow streams. A common mixing cavity in fluid communication with the mixing passageways reunites the separated flow streams and conveys the material into a gating device for introduction into the mold cavity. Adjustment means is provided for selectively altering the size of the common mixing cavity and the size of its inlets in order to selectively alter the back-pressure exerted on the material flowing therethrough. Such adjustment feature allows for the optimization of the back-pressure and thus the intermixing of the constituents of the material for a given flow rate and inlet pressure thereof. Preferably, the mixing passageways each extend along a generally sepentine path including at least one bight portion adapted to cause the material flowing therethrough to substantially reverse its direction of flow in order to increase turbulence and enhance the mixing of the material constituents.

At least a portion of the preferred mold cavity of the reaction injection molding system includes one or more elongated elastomeric members positioned generally adjacent the peripheral edge of the mold cavity for supportingly engaging the mold members and the window panel. The flexible elongated elastomeric members are preferably seated in grooves in one or the other of the mold members and are further adapted to substantially minimize or prevent flashing of the gasket material out of the mold cavity and also serve to accommodate variations in the shape of the window panels.

Additional objects, advantages and features of the present invention will become apparent from the following description and appended claims, taken in conjunction with the accompanying drawings.

DETAILED DESCRIPTION OF THE PREFERRED EMBODIMENTS

Figure 1:
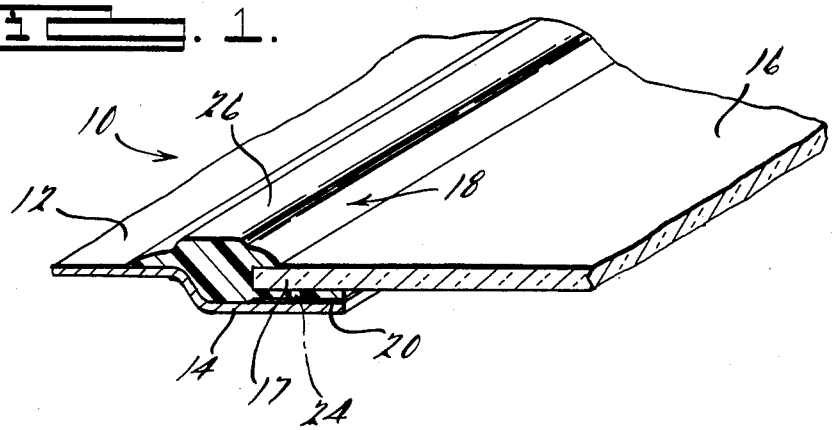
FIG. 1 illustrates a portion of an exemplary vehicular window assembly, partially in cross-section, having a window gasket member integrally molded onto a transparent window panel in accordance with the present invention.

In FIGS. 1 through 5, exemplary embodiments of the present invention are illustrated for the reaction injection molding of integrally-molded vehicular window panel gaskets onto their associated glass or other transparent window panels. One skilled in the art will readily recognize from the following discussion, however, that the principles of the invention are equally applicable to reaction injection molding of items other than vehicular window gaskets, as well as being applicable to apparatus other than the reaction injection molding system shown in the drawings.

FIG. 1, a vehicular window assembly 10 generally includes a vehicle body or other panel 12 having a recessed portion 14 surrounding an opening for receiving a substantially transparent window panel therein. In the exemplary window assembly 10 illustrated in FIG. 1, a transparent window panel 16, which is preferably glass, has a window gasket member 18 integrally molded thereon, with an edge portion 17 of the window panel substantially embedded in the gasket member 18. The gasket and window panel assembly is secured to the recessed portion 14 by means of an adhesive material 20 without the need for mechanical fasteners protruding through apertures in the body panel. By eliminating the need for such fasteners, the cross-sectional profile of the gasket member 18 may be minimized in order to provide a smooth relatively unobtrusive fit with the body panel 12, thereby reducing the aerodynamic drag on the vehicle. Also, because the gasket member and window panel assembly is secured and bonded substantially continuously around its periphery, the window panel effectively becomes part of the body structure and is not subjected to the localized stress concentrations caused by discrete mechanical fasteners. Thus the window panel 16 can be thinner and lighter in weight than those previously used. Optionally, however, if direct bonding between the body panel 12 and the window panel 16 is desired, the window gasket member 18 may optionally be formed with a channel-shaped opening 24 extending therethrough in order to allow a suitable adhesive to bond the window panel 16 directly to the recessed portion 14. Such optional channel-shaped opening 24 may consist of either a single opening extending continuously throughout the entire window gasket member 18, or a series of discrete channel-shaped openings at spaced locations throughout the window gasket member.

As will become apparent from the discussion below, the window gasket member 18 may also optionally include a coating of pigmented material either on its entire exterior surface, or on a predetermined portion thereof, as illustrated by reference numeral 26. Such coating of pigmented material can be applied to the window gasket member 18 during the molding process in order to provide a decorative stripe on its exterior surface, or to color the window gasket member in order to complement the color scheme of the vehicle.

The window gasket member 18 is preferably molded from a multi-constituent material, such as liquid urethane material for example. Such urethane material may be composed, for example, of a polyol resin constituent, an isocyanate constituent, and a catalyst. Examples of commercially-available polyol resins are manufactured by The Dow Chemical Company under the trademark VORANOL and by Texaco Chemical Company under the trademark THANOL SF-6503. Examples of commercial isocyanates are produced by The Upjohn Company under the trademarks ISONATE 143L, ISONATE 181, ISONATE 191 and ISONATE 240, and also by Mobay Chemical Corporation under the trademarks MONDUR PF and MONDUR CD. An example of a suitable catalyst for such urethane material is marketed by Witco Chemical Company under the trademark WITCO FOMREZ UL-28.

Figure 2:
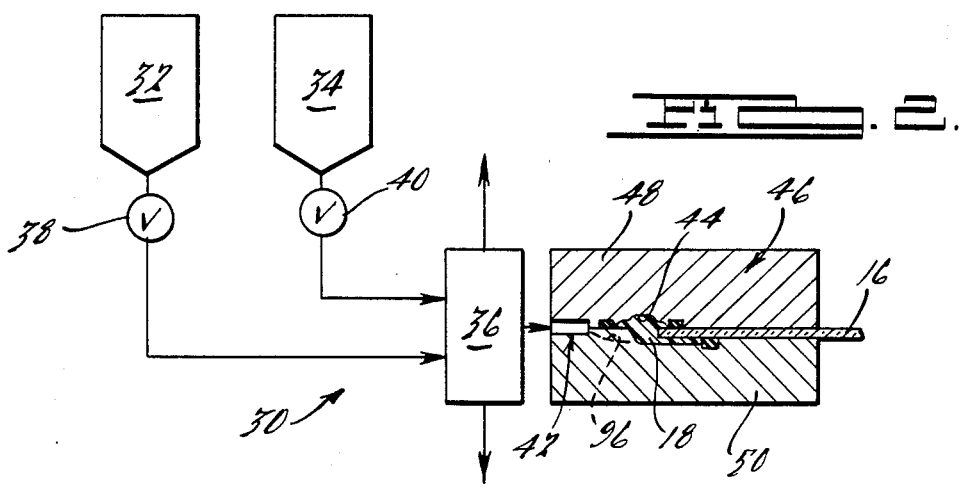
FIG. 2 is a schematic diagram illustrating a reaction injection molding system for fabricating the gasket and window panel assembly of FIG. 1.

As illustrated schematically by the reaction injection molding system 30 in FIG. 2, the constituents of window gasket material are injected from two or more constituent sources 32 and 34 into a high-pressure mixing apparatus 36 by way of the respective metering devices 38 and 40. The constituents of the material are mixed in the high-pressure mixing apparatus 36 at pressures in the range of approximately 2000 p.s.i.g. to approximately 3000 p.s.i.g. and are conveyed to an aftermixer and gating apparatus 42. As discussed below, the aftermixer and gating apparatus 42 further mixes the constituents of the gasket material and reduces its pressure to a range of approximately 30 p.s.i.g. to approximately 100 p.s.i.g., and preferably approximately 50 p.s.i.g., before introducing the material into a mold cavity 44 of a mold apparatus 46.

Prior to the injection of the multi-constituent gasket material into the mold apparatus 46, the mold cavity is preferably coated with any of a number of known mold release agents, which typically consist of low-melting point waxes or silicon oils, for example. Commercial examples of mold release agents are produced by Contour Chemical Company under the tradmark KRAXO 1711, EXITT II, TRULEASE 125, LIFFT and NON-STICKENSTOFFE, by Frekote Inc. under the trademarks FREKOTE 34, FREKOTE 34H, FREKOTE 31, and FREKOTE 31H, and by Park Chemical Company under the trademark PRC789. The volatile mold release agent is then allowed to at least partially flash off of the mold apparatus which is typically at a temperature in the range of approximately 110F to approximately 160F.

If desired, all of the mold cavity surface, or a predetermined portion thereof, may be coated with a pigmented material so that the pigmented material will be transferred in the mold to the desired surface or surfaces of the gasket or other molded article during the reaction injection molding process. An example of such pigmented material coating is manufactured by Sherwin Williams Company under the trademark POLANE. After the pigmented material coating has been allowed to flash off, the window panel 16 is positioned in the mold and the mold members 48 and 50 of the mold apparatus 46 are closed, substantially in mutual engagement with one another. The constituents of the gasket material are injected into the system, mixed and introduced into the mold cavity 44 as described above, and the window panel 16 with the window gasket 18 integrally molded thereon is then removed.

As is known to those skilled in the reaction injection molding art, the intermixed constituents of the molding material undergo a rapid and highly exothermic reaction in the mold cavity and are approximately 70% cured within a very short time, generally less than one to six minutes, depending upon the catalyst employed. After such time, the molded article may be removed from the molding apparatus and allowed to cool at ambient temperatures.

Figure 3:
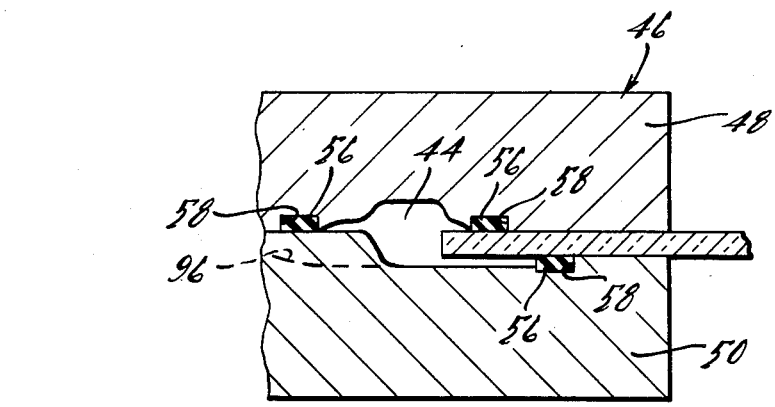
FIG. 3 is a partial cross-sectional view of a mold apparatus for the molding system illustrated in FIG. 2.

As illustrated in FIG. 3, at least one, and preferably both, of the mold members 48 and 50 include an elongated elastomeric bead member 56 compressingly seated within a corresponding groove 58. The grooves 58 are positioned generally adjacent the peripheral edges of the mold cavity 44 so that the elastomeric members 56 compressingly engage and sealingly support either the opposite mold member or the window panel 16 and also substantially prevent or minimize flashing of the molding material out from the mold cavity 44. When the mold apparatus is open, the elastomeric members 56 preferably protrude slightly from their associated grooves 58 so that the force required to hold the mold members 48 and 50 together in a sealing engagement is substantially reduced from the force that would be necessary if the mold members were required to be forced into direct contact with one another. Similarly, a significantly reduced pressure is exerted on the window panel 16 and consequently the frequency of breakage of the window panels is substantially minimized or eliminated. Such reduction in the force required to hold the mold members together is also significantly less than that required in conventional compression and injection molding processes. Additionally, the elastomeric members 56 are sufficiently flexible to allow for minor variations in the shape and contour of the window panels and thereby sealingly isolate the mold cavity 44 regardless of such minor window panel variations.

Figure 4:
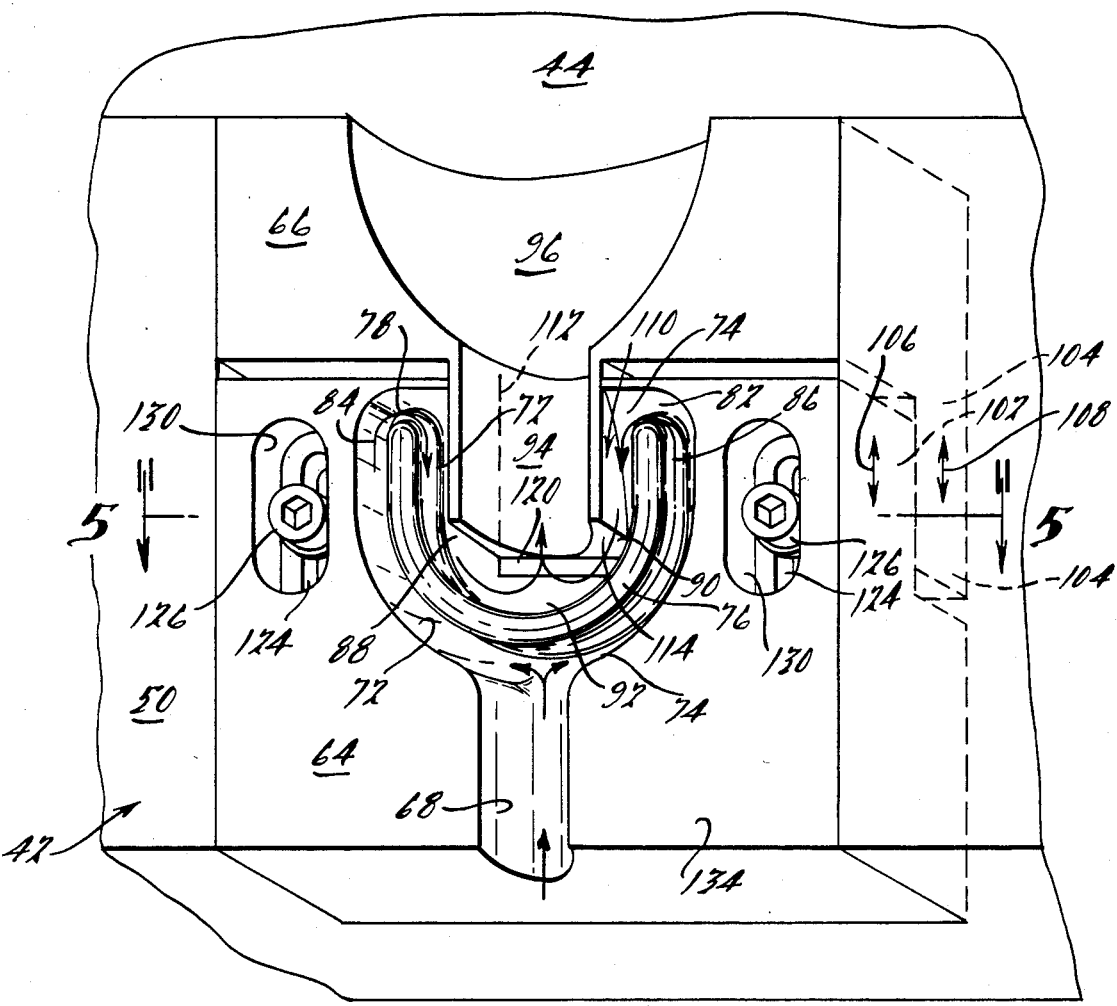
FIG. 4 is a perspective view of an aftermixer and gating apparatus for a reaction injection molding apparatus in accordance with the present invention.
Figure 5:
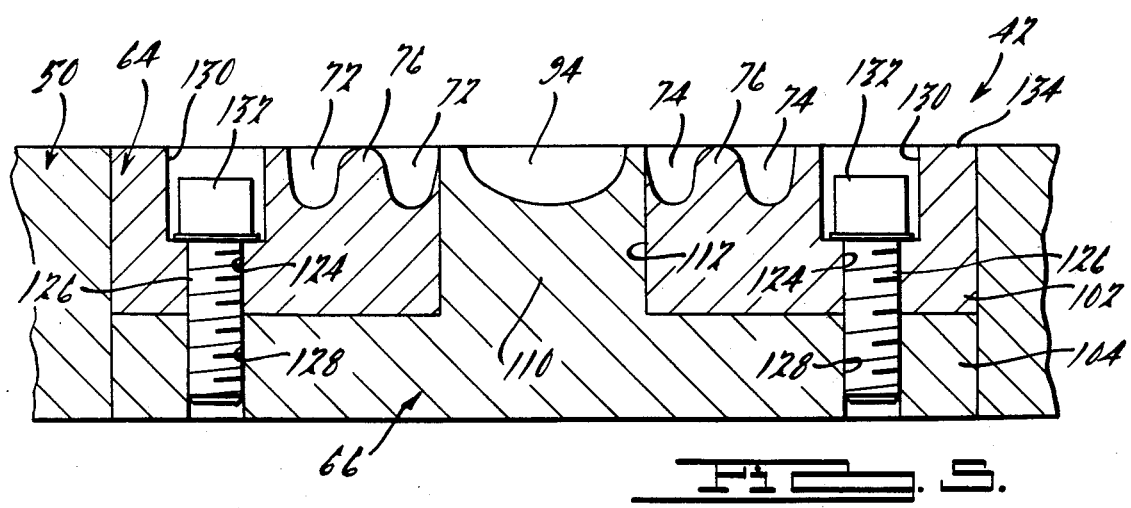
FIG. 5 is a cross-sectional view taken along line 5—5 of FIG. 4.

FIGS. 4 and 5 illustrate an improved aftermixer and gating apparatus 42, generally including an aftermixer block or body 64 and a gating block or body 66 position in one or the other of the mold members 48 or 50 for further mixing the constituents of the gasket material and admitting the material to the mold cavity 44.

The aftermixer body 64 includes at least one common inlet passageway 68 for receiving the gasket material from the high-pressure mixing apparatus 36 at a predetermined flow rate and pressure. The gasket material flows through the inlet passageway 68 into at least a pair of curvilinear mixing passageways 72 and 74 where it is separated into a corresponding number of flow streams. Such separation increases the turbulence of the gasket material flow and accordingly enhances the intermixing of its constituents. The mixing passageways 72 and 74 include a divider wall 76 therein, which form a generally serpentine path in the mixing passageways. Such serpentine path includes at least one bight portion 78 in the mixing passageway 72 and a similar bight portion 82 in the mixing passageway 74. Such bight portions cause the gasket material to substantially reverse its direction of flow, as indicated by the flow arrows 84 and 86, respectively, in order to increase the turbulence of each of the gasket material flow streams and enhance the intermixing of the constituents therein.

Once the gasket material flows through the mixing passageways 72 and 74, it enters a corresponding number of respective inlet openings 88 and 90 of at least one common mixing cavity 92. The flow streams from the mixing passageways are reunited in the mixing cavity 92, which again reverses the flow directions of the flow streams, increases their turbulence, and enhances the intermixing of the gasket material constituents. The reunited and intermixed gasket material from the mixing cavity is received by the inlet passageway 94 in the gating body, wherein it is conveyed through a diverging fan-gate passageway 96 to the mold cavity 44.

The aftermixer body 64 preferably includes a stepped or offset portion 102 adapted to slidingly engage a preferably corresponding stepped or offset portion 104 on the gating body 66, such that the aftermixer body 64 and the gating body 66 may be slidably and adjustably moved toward or away from one another as indicated by the arrows 106 and 108. The gating body 66 also includes an integrally-formed tongue portion 110 in which the gating inlet passageway 94 is formed. The tongue portion 110 is slidably received in a slot 112 in the aftermixer body 64 for slidable and adjustable movement therein as the aftermixer and gating bodies are adjustably moved as described above. The end portion 114 of the tongue portion 110 defines the exit portion of the mixing cavity 92 such that selective movement of the tongue portion 110 in the slot 112 allows the sizes of the mixing cavity 92 and its inlet openings 88 and 90 to be selectively altered as the aftermixer and gating bodies are selectively and adjustably moved. Thus the sizes of the mixing cavity and its inlet openings may be selectively and adjustably increased as the aftermixer and gating bodies are moved apart from one another, and correspondingly such sizes may be selectively and adjustably decreased as the aftermixer and gating bodies are moved toward one another. In order to fill the unoccupied gap in the slot 112 in the aftermixer body 64 after the aftermixer body has been adjustably moved away from the gating body 66, one or more shim members 120 are removably insertable into the slot adjacent the end portion 114 of the tongue 110.

The aftermixer body 64 is preferably provided with one or more elongated openings 124 therethrough for receiving a threaded fastener 126 extending therethrough. The threaded fastener is adapted to threadably engage a threaded aperture 128 in the gating body 66 and serves as a locking means for fixing a preselected position of the tongue portion 110 in the slot 112. Preferably, the aftermixer body 64 is also provided with countersunk portions 130 for allowing the head portions 132 of the fasteners 126 in a recessed relationship with the surface 134 of the aftermixer body 64.

The above-described selective adjustments to the size of the mixing cavity 92 and its inlet openings 94 and 96 allow for the selective alteration of the back-pressure exerted by the aftermixer and gating apparatus 42 on the gasket material flowing therethrough. Such alteration thereby allows for the selective optimization of the intermixing of the constituents of the gasket material for a predetermined flow rate and pressure of the material from the high-pressure mixing apparatus 36 shown schematically in FIG. 2. By such adjustments, therefore, the user of the reaction injection molding system may "fine-tune" the process to achieve optimum intermixing and reaction of the constituents of the molding material as well as achieving greater control over the pressure at which the molding material is introduced into the mold cavity.

The foregoing discussion discloses and describes exemplary embodiments of the present invention. One skilled in the art will readily recognize from such discussion that various changes, modifications and variations may be made therein without departing from the spirit and scope of the invention as defined in the following claims.

What is claimed is:

1. A static mixer apparatus for a mold adapted for molding a flowable material, said static mixer apparatus comprising: a mixer block; and a mold gate member;

said static mixer apparatus having an inlet passage defined by a surface of said mixer block, and a plurality of serpentine passages in communication with said inlet passage and at least in part defined by surfaces of said mixer block and said mold gate member; said mold gate member being movable relative to said mixer block in a generally axial direction with respect to said inlet passage in order to vary the flow areas of at least portions of said serpentine passages.

2. An apparatus according to claim 1, wherein each of said serpentine passages includes at least one bight portion adapted to cause the material flowing therethrough to substantially reverse its direction of flow at least once as it flows from said inlet passage through each said serpentine passage.

3. In a reaction injection molding apparatus for fabricating articles from a multi-constituent material in a mold cavity, said apparatus including mixing means for intermixing the constituents of said material and gating means for conveying said intermixed material to said mold cavity, the improvement wherein said mixing means comprises:

a mixing body having at least one inlet passageway therein for receiving said material in a flowable state;

at least two generally serpentine passageways in fluid communication with said common inlet passageway and being adapted for separating said flowable material into a corresponding member of flow streams, each of said serpentine passageways including at least a pair of curvilinearly-extending portions interconnected by a bight portion therebetween, each of said flow streams being caused to substantially reverse their directions of flow at said bight portions at least once, in order to create an increased turbulent flow condition and to enhance the intermixing of said constituents;

a mixing cavity in fluid communication with said serpentine passageways and defined in part by terminal portions of said serpentine passageways adapted for reuniting said flow streams, said mixing cavity being in fluid communication with said gating means for conveying said intermixed material thereto; and a mold gate member selectively movable relative to said mixing body in a generally axial direction with respect to said common inlet passageway in order to selectively vary the flow area of said mixing cavity.

4. The improvement according to claim 3, wherein said gating means includes at least one gating inlet passageway for receiving said intermixed material from said cavity, and a generally fan-shaped gate passageway extending between said gating inlet passageway and said mold cavity.

5. An apparatus according to claim 3, further including a mold apparatus including a first mold member and a second mold member mutually engageable with one another and defining a mold cavity therebetween, at least one of said mold members including at least one elongated elastomeric member thereon generally adjacent an edge of said mold cavity and extending generally around the periphery thereof, said elastomeric member supportingly engaging the other of said mold members and being adapted to substantially prevent flashing of said material out of said mold cavity.

6. An apparatus according to claim 5, further comprising locking means for fixing a preselected position of said mold gate member relative to said mixing body.

7. An apparatus according to claim 5, wherein said mold cavity is adapted to receive a window panel inserted therein prior to the introduction of said material into said mold cavity, in order to form a window gasket member molded in place or an edge portion of said window panel within said mold cavity.

8. In a reaction injection molding apparatus for fabricating articles from a multi-constituent material in a mold cavity, said apparatus including mixing means for intermixing the constituents of said material and gating means for conveying said intermixed material to said mold cavity, the improvement wherein said mixing means comprises:

a mixing body having at least one inlet passageway therein for receiving said material in a flowable state;

at least two generally serpentine passageways in fluid communication with said common inlet passageway and being adapted for separating said flowable material into a corresponding member of flow streams; and a mixing cavity in fluid communication with said serpentine passageways and being adapted for reuniting said flow streams, said mixing cavity including a number of mixing cavity inlet passages for receiving said intermixed material from said flow streams therethrough and adjustment means for selectively adjusting the size of said mixing cavity inlet passages, said adjustment means including a mold gate member in part defining said mixing cavity and being selectively movable relative to said mixing body in a generally axial direction with respect to said common inlet passageway in order to selectively vary the flow area of said mixing cavity, said mixing cavity further being in fluid communication with said gating means for conveying said intermixed material thereto.

9. The improvement according to claim 8, wherein said adjustment includes means for selectively adjusting the size of said cavity.

10. The improvement according to claim 8, wherein said gating means includes at least one gating inlet passageway for receiving said intermixed material from said cavity, and a generally fan-shaped gate passageway extending between said gating inlet passageway and said mold cavity.

* * * * *

UNITED STATES PATENT AND TRADEMARK OFFICE
CERTIFICATE OF CORRECTION

PATENT NO. : 4,648,832

DATED : March 10, 1987

INVENTOR(S) : Reilly, et al

It is certified that error appears in the above-identified patent and that said Letters Patent is hereby corrected as shown below:

On the Title Page Under "U.S. Patent Documents"
Reference 2,266,235 "Mollare" should be —Mollard—

On the Title Page Under "U.S. Patent Documents"
Reference 3,744,201 "Dohnahl" should be —Dochnahl—

On the Title Page Under "U.S. Patent Documents"
Insert —1,911,578 (5/53) Masters—

On the Title Page Under "Other Publications"
"3,759,004 09001973 Kent 52 400" should be under
U.S. Patent Documents as —3,759,004 (9/73) Kent—

Column 3, line 15, before "FIG. 1" insert —In—

Column 7, line 44, Claim 3, begin new paragraph with
"a mold gate..."

UNITED STATES PATENT AND TRADEMARK OFFICE
CERTIFICATE OF CORRECTION

PATENT NO. : 4,648,832

DATED : March 10, 1987

INVENTOR(S) : Reilly, et al.

It is certified that error appears in the above-identified patent and that said Letters Patent is hereby corrected as shown below:

Column 8, line 15, Claim 7, "or" should be -- on --.

Signed and Sealed this

Sixteenth Day of February, 1988

*Attest:*

DONALD J. QUIGG

*Attesting Officer*   *Commissioner of Patents and Trademarks*